US007389129B2

(12) United States Patent
Shoji

(10) Patent No.: US 7,389,129 B2
(45) Date of Patent: Jun. 17, 2008

(54) WIRELESS COMMUNICATION APPARATUS

(75) Inventor: Hideaki Shoji, Chiba (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 522 days.

(21) Appl. No.: 10/700,846

(22) Filed: Nov. 4, 2003

(65) Prior Publication Data

US 2004/0137971 A1 Jul. 15, 2004

(30) Foreign Application Priority Data

Nov. 6, 2002 (JP) .......................... P2002-321981

(51) Int. Cl.
*H04M 1/00* (2006.01)

(52) U.S. Cl. ............................ 455/575.5; 455/575.1; 455/575.7; 455/90.3; 343/702

(58) Field of Classification Search ............ 455/575.5, 455/575.1, 575.7, 90.3; 343/702
See application file for complete search history.

(56) References Cited

U.S. PATENT DOCUMENTS

| | | | | |
|---|---|---|---|---|
| 1,418,642 | A * | 6/1922 | Gerard | 366/77 |
| 4,723,305 | A * | 2/1988 | Phillips et al. | 455/575.7 |
| 5,365,246 | A * | 11/1994 | Rasinger et al. | 343/702 |
| 5,907,305 | A * | 5/1999 | Epp et al. | 343/700 MS |
| 6,229,490 | B1 * | 5/2001 | Hofmann | 343/702 |
| 6,232,548 | B1 * | 5/2001 | Eberler et al. | 174/350 |
| 6,377,475 | B1 * | 4/2002 | Reis | 361/818 |
| 6,404,394 | B1 * | 6/2002 | Hill | 343/702 |
| 6,417,807 | B1 * | 7/2002 | Hsu et al. | 343/700 MS |
| 6,424,300 | B1 | 7/2002 | Sanford et al. | |
| 6,614,400 | B2 * | 9/2003 | Egorov | 343/702 |
| 6,686,886 | B2 * | 2/2004 | Flint et al. | 343/702 |
| 6,853,336 | B2 * | 2/2005 | Asano et al. | 343/702 |
| 2002/0021250 | A1 * | 2/2002 | Asano et al. | 343/702 |
| 2002/0127971 | A1 * | 9/2002 | Chen et al. | 455/67.4 |
| 2002/0190905 | A1 * | 12/2002 | Flint et al. | 343/702 |
| 2004/0137971 | A1 * | 7/2004 | Shoji | 455/575.5 |

FOREIGN PATENT DOCUMENTS

| | | |
|---|---|---|
| EP | 0 851 530 | 7/1998 |
| JP | 5 243837 | 9/1993 |

(Continued)

*Primary Examiner*—Matthew Anderson
*Assistant Examiner*—Minh Dao
(74) *Attorney, Agent, or Firm*—Frommer Lawrence & Haug LLP; William S. Frommer; Thomas F. Presson

(57) ABSTRACT

The present invention provides a wireless communication apparatus that allows miniaturization of the wireless communication apparatus as a whole and improvement of characteristics of an antenna device. A notch portion is formed in a shield case formed of a conductive material that covers a radio-frequency wireless communication circuit provided on a printed wiring board so as to house the radio-frequency wireless communication circuit within the shield case. By feeding power to the notch portion, the shield case is operated as a slot antenna. At the same time, the shield case blocks undesired electromagnetic waves emitted from the radio-frequency wireless communication circuit. Alternatively, a notch antenna is formed by opening one end of the notch portion formed in the shield case. By thus making the shield case function as electromagnetic wave shielding member and also function as the slot antenna or the notch antenna, the wireless communication apparatus as a whole is miniaturized.

7 Claims, 7 Drawing Sheets

FOREIGN PATENT DOCUMENTS

| | | |
|---|---|---|
| JP | 7 176646 | 7/1995 |
| JP | 9 116240 | 5/1997 |
| JP | 11 251948 | 9/1999 |
| JP | 11 284431 | 10/1999 |
| JP | 11 308030 | 11/1999 |
| JP | 2000 68866 | 3/2000 |
| JP | 2000 196344 | 7/2000 |
| JP | 2001 292026 | 10/2001 |
| JP | 2001 298321 | 10/2001 |
| JP | 2002 76757 | 3/2002 |
| JP | 2002 84117 | 3/2002 |

* cited by examiner

WIRELESS COMMUNICATION APPARATUS

BACKGROUND OF THE INVENTION

The present invention relates to a wireless communication apparatus, and particularly to a wireless communication apparatus that can be reduced in size and improve antenna characteristics.

Conventionally, in miniaturizing a wireless communication apparatus, a radio-frequency wireless communication circuit (RF circuit) and an antenna are miniaturized separately from each other. When the RF circuit and the antenna circuit are miniaturized separately from each other, however, there is a limit to miniaturization of the wireless communication apparatus as a whole.

Accordingly, in general, attempts have been made to miniaturize the wireless communication apparatus as a whole by integrating a module and a semiconductor used in the wireless communication circuit with the antenna (see for example patent literature 1, patent literature 2, patent literature 3, and patent literature 4).

In a receiving module unit described in the patent literature 1, an antenna and a circuit protected with a shield pattern for magnetic shielding are formed on an identical plane, whereby the receiving module as a whole is miniaturized and mutual effects between the circuits are eliminated.

In a semiconductor package described in the patent literature 2, an antenna pattern in a shape of one loop is provided around an IC chip on a circuit board, thereby effecting miniaturization.

In an antenna module and a wireless communication apparatus using the antenna module described in the patent literature 3, an antenna is laminated on a circuit board via a dielectric substrate, and a layout of internal parts is optimized to avoid effects on a portion that greatly contributes to frequency bandwidth in the antenna device, thereby effecting miniaturization.

In the case of an antenna built in a computer terminal described in the patent literature 4, which antenna is not integrated with a wireless communication circuit, a slot antenna is formed using a thin plate-shaped stay, and the slot antenna is installed in a gap at a sidewall of a computer frame, thereby effecting miniaturization.

[Patent Literature 1]

Japanese Patent Laid-Open No. Hei 9-116240 (page 3, FIG. 1)

[Patent Literature 2]

Japanese Patent Laid-Open No. Hei 7-176646 (page 2 and page 3, FIG. 1)

[Patent Literature 3]

Japanese Patent Laid-Open No. 2001-298321 (page 3 and page 4, FIG. 1)

[Patent Literature 4]

Japanese Patent Laid-Open No. 2002-84117 (page 5 and page 6, FIG. 2 and FIG. 5)

However, the receiving module unit in the patent literature 1 and the semiconductor package in the patent literature 2 have problems in that when a ground pattern of the board is adjacent to the antenna pattern, antenna efficiency is degraded significantly and, at the same time, a narrower band results.

As to the antenna module and the wireless communication apparatus in the patent literature 3, it is known regarding frequency bandwidth and antenna efficiency of a line-shaped antenna and a plate-shaped antenna that characteristics including radiation resistance, a frequency band and the like are generally determined in proportion to a square of a distance from a ground of the board to the antenna device. Depending on required specifications, sufficient miniaturization is difficult in some cases with these structures.

The antenna built in the computer terminal in the patent literature 4 is a slot antenna. However, this slot antenna requires a ground plate that is sufficiently wide with respect to the wavelength. In addition, to avoid electromagnetic coupling with the wireless communication circuit, the antenna is installed at a distance from the wireless communication circuit or the antenna and the wireless communication circuit are used on respective boards separate from each other in many cases, thus making miniaturization difficult.

SUMMARY OF THE INVENTION

Accordingly, the present invention has been made in view of such problems, and it is an object of the present invention to provide a wireless communication apparatus that can be reduced in size and improve antenna characteristics.

According to the present invention, a conductive member is provided so as to cover a circuit component provided on a printed wiring board. Further, a slot antenna is constructed by forming a notch portion in at least a part of the conductive member.

With the wireless communication apparatus according to the present invention, the conductive member provided so as to cover the circuit component on the printed wiring board blocks undesired electromagnetic waves emitted from the circuit component. Also, the conductive member having the notch portion in a part thereof functions as the slot antenna.

DETAILED DESCRIPTION OF THE PREFERRED EMBODIMENTS

Concrete embodiments to which the present invention is applied will hereinafter be described in detail with reference to the drawings. The present embodiments are examples in which a wireless communication apparatus according to the present invention is applied to a portable telephone.

First Embodiment

Figure 1:
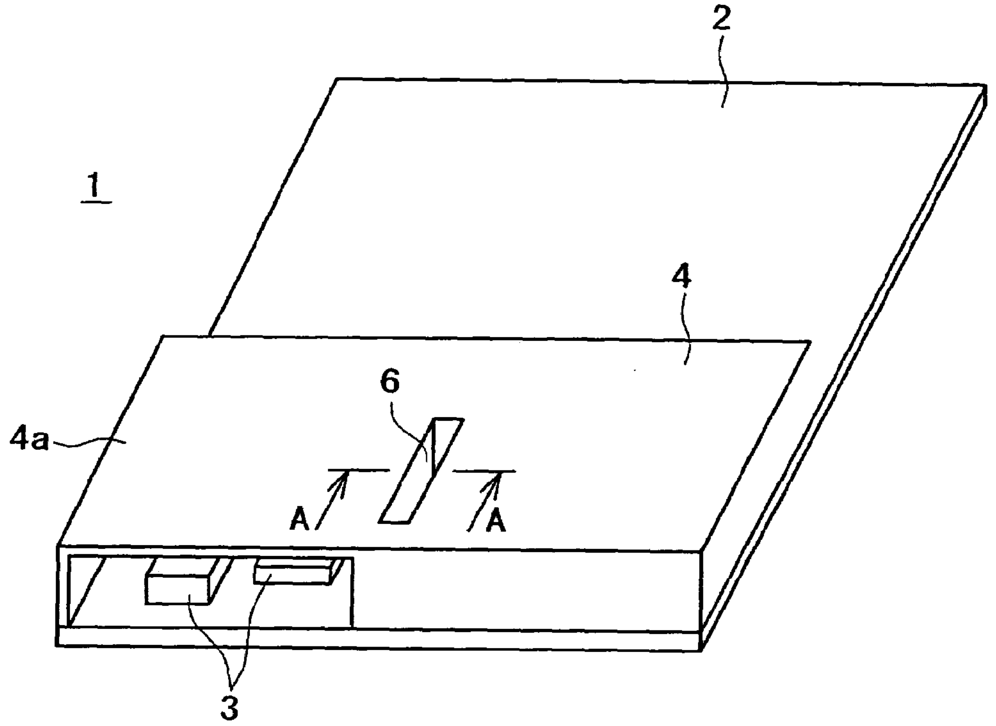
FIG. 1 is a perspective view of a wireless communication apparatus according to a first embodiment having a slot antenna in a form of a long and narrow rectangular notch portion.
Figure 2:
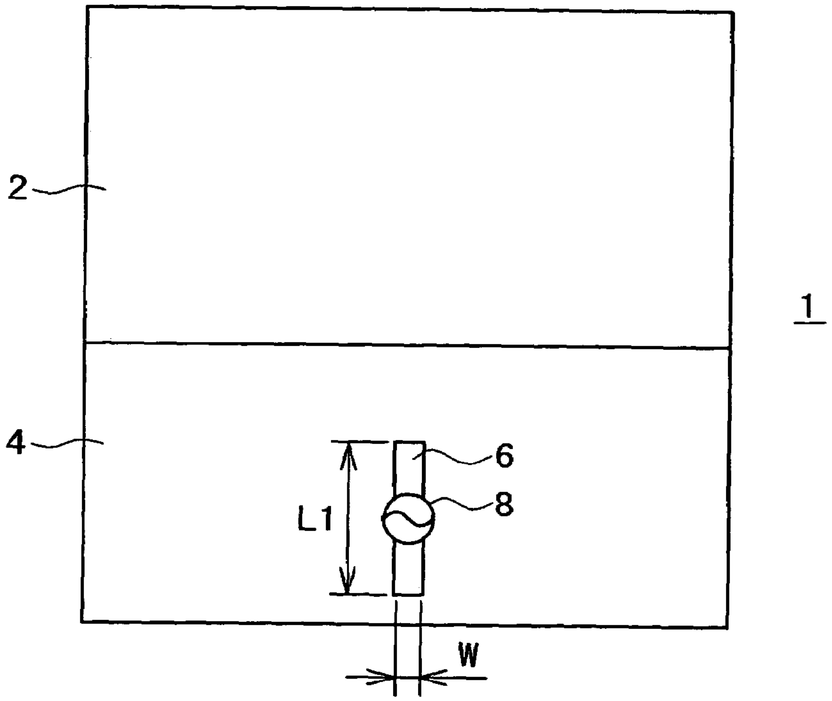
FIG. 2 is a plan view of the wireless communication apparatus according to the first embodiment shown in FIG. 1.

As shown in FIG. 1 and FIG. 2, a wireless communication apparatus 1 according to the first embodiment mainly includes a circuit component, for example a radio-frequency wireless communication circuit (RF circuit) 3 provided on a printed wiring board 2, and a shield case 4 as a conductive member disposed (provided) on the printed wiring board 2 so as to cover the radio-frequency wireless communication circuit 3 within the shield case 4.

Figure 3:
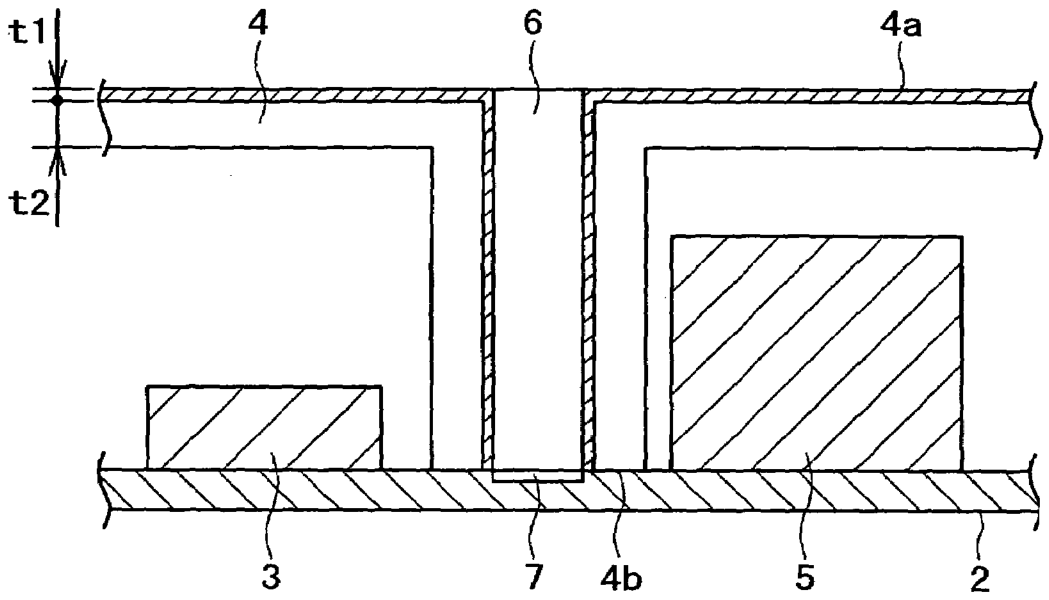
FIG. 3 is an enlarged sectional view taken along a line A-A of FIG. 1, showing the wireless communication apparatus according to the first embodiment.

In addition to the radio-frequency wireless communication circuit 3, various electronic parts 5 such as an LSI and the like comprising a control unit for signal processing are mounted on the printed wiring board 2, as shown in FIG. 3. The radio-frequency wireless communication circuit 3 is an RF circuit used in an ordinary portable telephone, and is a circuit for transmitting and receiving a radio-frequency signal via an antenna.

The shield case 4 is in a shape of a box of such a size as to be able to house the radio-frequency wireless communication circuit 3 and the various electronic parts. 5 within the shield case 4. The shield case 4 is formed of a conductive material, and opened at a bottom opposed to the printed wiring board 2. The conductive material forming the shield case 4 includes a resin plated with copper or silver, for example, copper treated to be rust resistant, and the like. The shield case 4 functions as an electromagnetic wave shielding member for blocking undesired electromagnetic waves emitted from the radio-frequency wireless communication circuit 3. Also, the shield case 4, specifically a skin portion of a top surface 4*a* functions as a ground conductor of a slot antenna.

Specifically, as shown in FIGS. 1 to 3, the shield case 4 has a notch portion (slot portion) 6 formed therein, which portion operates as a slot antenna. The notch portion 6 is formed as a through hole extending from the top surface 4*a* of the shield case 4 to a bottom surface 4*b* of the shield case 4, and having a long and narrow rectangular plane shape in a direction of thickness thereof. Length L1 in a longitudinal direction of the notch portion 6 is set at ½ of a wavelength λ of a frequency used in the portable telephone, for example. Width W of the notch portion 6 is desirably about 1/150 or more of the wavelength λ of the frequency used in the portable telephone, for example.

A bottom portion 7 of the notch portion 6, that is, a surface of the printed wiring board 2 which surface is opposed to the notch portion 6 is an insulating portion for the functioning of the notch portion 6 as a slot antenna. In this example, the bottom portion 7 of the notch portion 6 is formed by removing a ground plane of the printed wiring board 2 to eliminate conductivity. Specifically, the surface portion of the printed wiring board 2 which portion is opposed to the notch portion 6 is a dielectric formed of glass epoxy by removing a conductor pattern or the like.

Further, the notch portion 6 has a feeding part 8 for receiving power fed from feeding means (not shown) provided on the printed wiring board 2. The feeding part 8 has for example a substantially central position of the notch portion 6 as a feeding point. The power fed to the notch portion 6 causes an electric field in the notch portion 6, so that the shield case 4 having the notch portion 6 functions as the slot antenna.

Thus, the shield case 4 functions as the slot antenna as well as functions to block undesired electromagnetic waves emitted from the radio-frequency wireless communication circuit 3. Hence, since the shield case 4 functions as the electromagnetic wave shielding member and also functions as the slot antenna, the shield case 4 requires such a thickness as to allow the shield case 4 to block undesired electromagnetic waves and satisfactorily function as the antenna.

Generally, it is known that a radio-frequency current occurring on a ground plate (ground conductor) of an antenna flows only in a surface of the ground plate when a conductor sufficiently thick with respect to the wavelength is used. In the case of radio frequencies such for example as a 2-GHz band used in next-generation portable telephones, in particular, a current flows only in a portion from the surface of the ground plate to about 2 μm in a direction of thickness. This is shown in FIG. 3, which shows a current flowing only in a skin portion of a thickness t1 represented by hatching in FIG. 3. A remaining portion (portion excluding the hatched portion) has a thickness t2 sufficient to block undesired electromagnetic waves emitted from the radio-frequency wireless communication circuit 3. Thus, when the thickness of the shield case 4 is determined in consideration of the frequency to be used, two aspects, that is, improvement of antenna characteristics and the blocking of undesired electromagnetic waves can be made compatible with each other.

In the first embodiment, leakage of the current to the radio-frequency wireless communication circuit 3 side within the case is so small as to present no problem as long as a ground plane of the radio-frequency wireless communication circuit 3 and the shield case 4 are in sufficient contact. Conversely, undesired electromagnetic waves such as harmonics emitted from the radio-frequency wireless communication circuit 3 have a closed electromagnetic field within the shield case 4. Therefore the undesired electromagnetic waves do not leak to the outside or do not adversely affect the slot antenna.

Hence, electromagnetic fields of the radio-frequency wireless communication circuit 3 and the slot antenna are isolated from each other by the intervening thickness of the shield case 4, so that the radio-frequency wireless communication circuit 3 and the slot antenna operate independently of each other. Electronic parts or the like comprising the radio-frequency wireless communication circuit 3 within the shield case 4 can therefore be mounted in the vicinity of the slot antenna. Thus, the slot antenna occupies only an area of the notch portion 6, thereby enabling reduction in size of the wireless communication apparatus as a whole.

In addition, the slot antenna uses a ground in the form of the ground plate. Therefore the slot antenna is not degraded in characteristics by the ground adjacent to the antenna, unlike a line-shaped antenna or a plate-shaped antenna. It is thus possible to ensure sufficient antenna characteristics while effecting size reduction. Further, a current flowing in the direction of the thickness of the shield case 4 is very small, and contributes little to the antenna characteristics. These advantages make it possible to reduce the size of the wireless communication apparatus according to the first embodiment.

Second Embodiment

Figure 4:
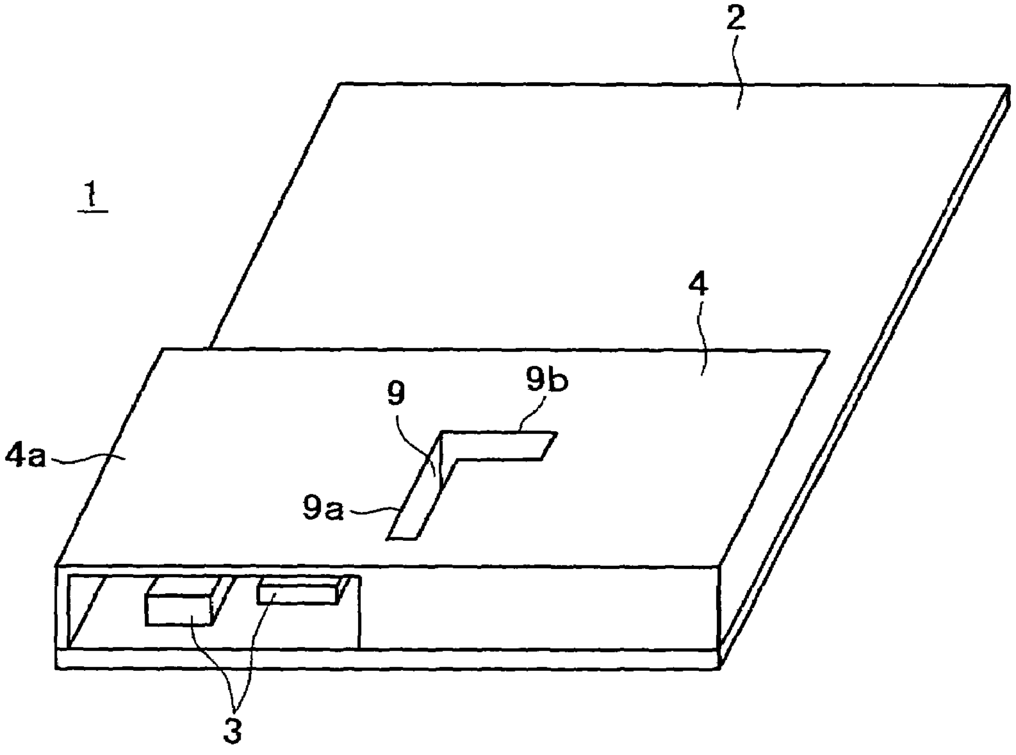
FIG. 4 is a perspective view of a wireless communication apparatus according to a second embodiment having a slot antenna as a notch portion in substantially a plane shape of an inverted L.
Figure 5:
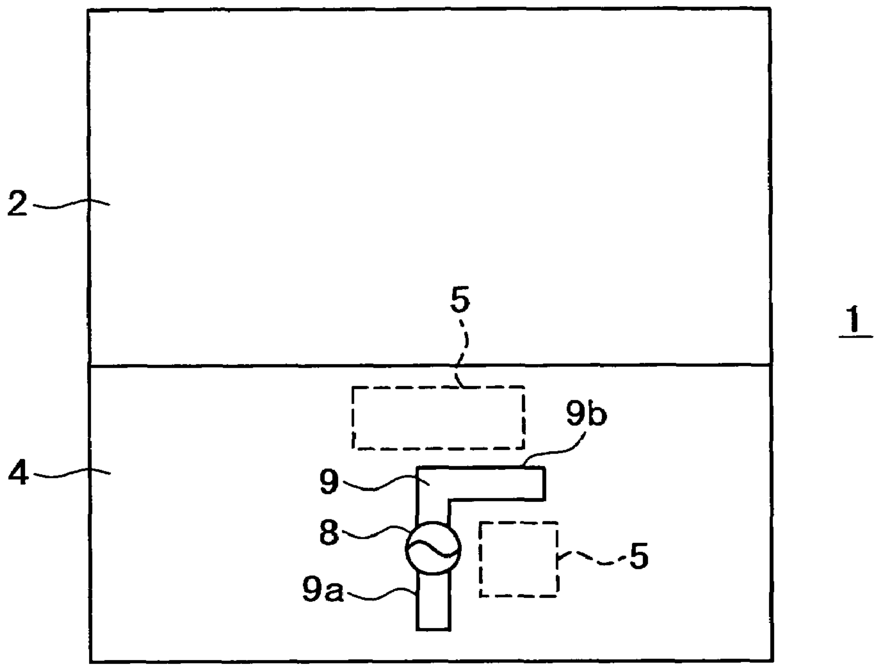
FIG. 5 is a plan view of the wireless communication apparatus according to the second embodiment shown in FIG. 4.

A wireless communication apparatus according to a second embodiment is an example in which at least a part of a notch portion 6 is bent. As shown in FIG. 4 and FIG. 5, a notch portion 9 of the wireless communication apparatus has substantially a plane shape of an inverted L. Specifically, the notch portion 9 in substantially the plane shape of an inverted L is formed by a straight portion 9*a* identical with the notch portion 6 of the first embodiment and a bent portion 9*b* provided so as to be substantially orthogonal to the straight portion 9*a* and continuous with a basal end portion of the straight portion 9*a*.

As in the first embodiment, the wireless communication apparatus has a feeding part 8 at substantially a central position of the straight portion 9*a* of the notch portion 9. A total length as a combination of length of the straight portion 9*a* and length of the bent portion 9*b* of the notch portion 9 in such a shape of an inverted L is about ½ of a wavelength of a frequency being used.

The shape of the notch portion 9 having a bent part rather than a simple straight shape as described above makes it possible to avoid electronic parts 5 disposed on a printed wiring board 2. From a different viewpoint, since the notch portion 9 can be formed so as to avoid the electronic parts 5 disposed on the printed wiring board 2, efficiency of mounting the electronic parts 5 on the printed wiring board 2 can be enhanced. Thus, the antenna can be designed according to an arrangement position of the electronic parts 5 mounted on the printed wiring board 2.

Figure 6:
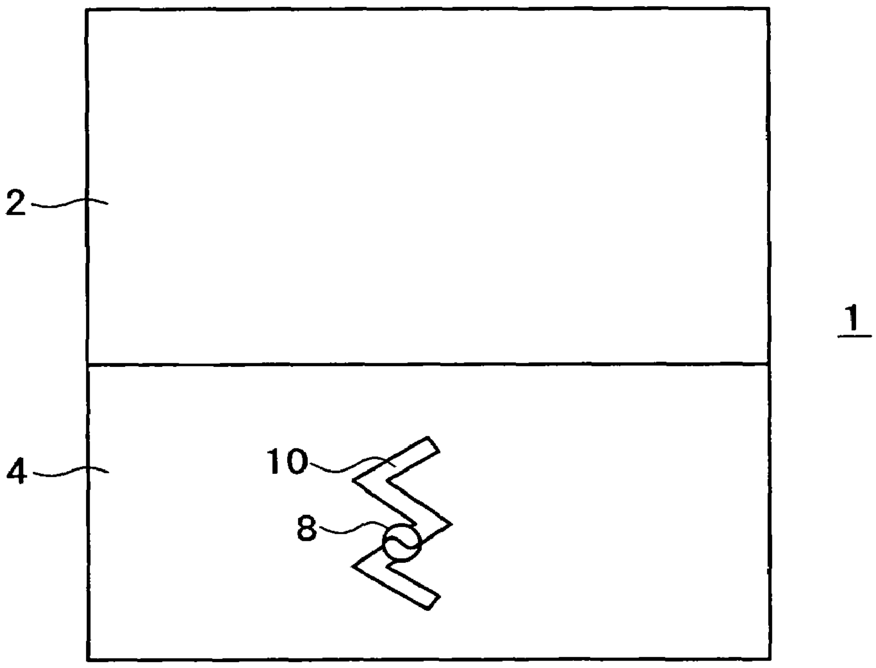
FIG. 6 is a plan view of a wireless communication apparatus according to the second embodiment having a slot antenna as a notch portion in a zigzag shape.
Figure 7:
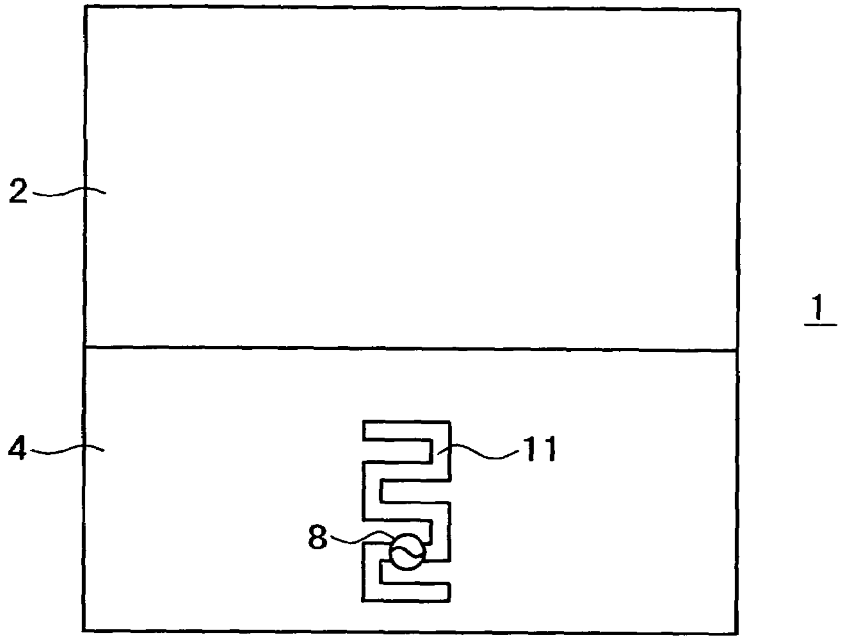
FIG. 7 is a plan view of a wireless communication apparatus according to the second embodiment having a slot antenna as a notch portion in a meander shape.
Figure 8:
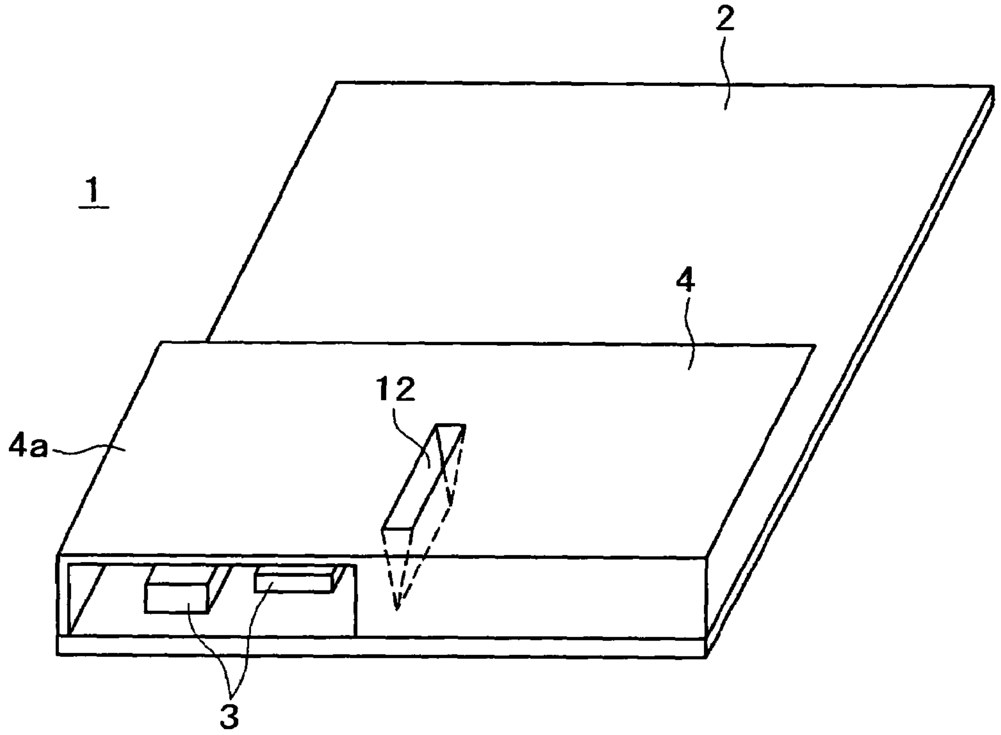
FIG. 8 is a plan view of a wireless communication apparatus according to the second embodiment having a slot antenna as a notch portion in a tapered shape.

FIG. 6 shows the shape of a notch portion 10 being a zigzag shape in accordance with an arrangement of electronic parts 5 arranged on a printed wiring board 2. FIG. 7 shows the shape of a notch portion 11 being a meander shape, or a comb-tooth shape, again in accordance with an arrangement of electronic parts 5 arranged on a printed wiring board 2. A total length of each of the notch portions 10 and 11 in the zigzag shape and the meander shape is again about ½ of a wavelength of a frequency being used. FIG. 8 shows the shape of a notch portion 12 being a tapered shape, again in accordance with an arrangement of electronic parts 5 arranged on a printed wiring board 2.

The notch portion 12 in the tapered shape has a rectangular shape at a part near an opening, and has an opening width gradually narrowed in a direction of thickness (a direction toward the printed wiring board 2). Viewed from a different direction, the notch portion 12 has substantially a shape of a quadrangular pyramid.

Third Embodiment

Figure 9:
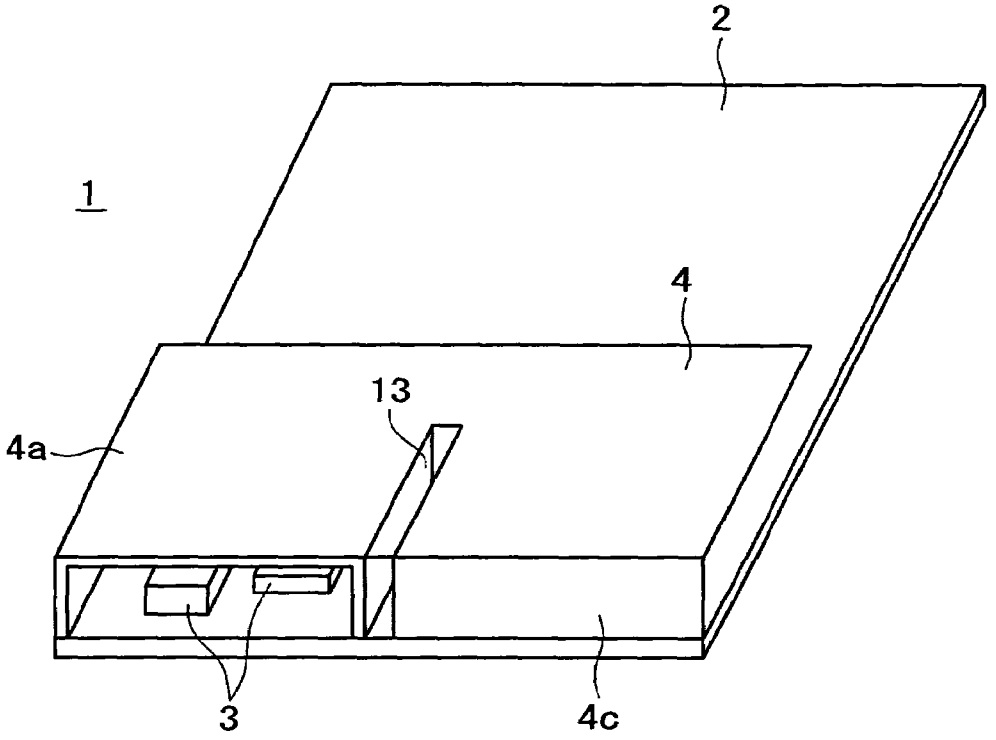
FIG. 9 is a perspective view of a wireless communication apparatus according to a third embodiment having a notch antenna formed by opening one end of a notch portion.
Figure 10:
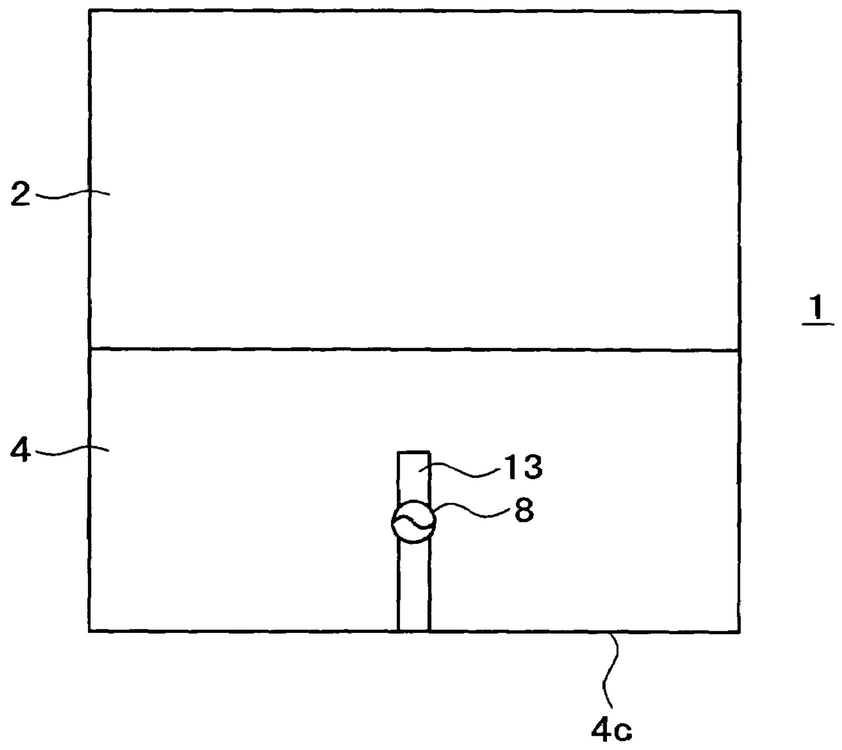
FIG. 10 is a plan view of the wireless communication apparatus according to the third embodiment shown in FIG. 9.

A wireless communication apparatus according to a third embodiment is an example obtained by opening one end of the notch portion 6 according to the first embodiment to form a notch antenna. As shown in FIG. 9 and FIG. 10, the wireless communication apparatus has the notch antenna formed by opening one end of the slot antenna according to the first embodiment. Specifically, a notch portion 13 having one end opened is formed in a shield case 4 by forming a long and narrow groove extending straight from a front end surface 4*c* of the shield case 4 to a rear.

By providing a feeding part 8 at substantially a central position of the notch portion 13 having one end opened, the shield case 4 operates as the notch antenna. As with the slot antenna, since the notch antenna uses a ground in the form of a ground plate, the notch antenna is not degraded in characteristics by the ground adjacent to the antenna, unlike a line-shaped antenna or a plate-shaped antenna. It is also possible to ensure sufficient antenna characteristics while effecting size reduction.

Fourth Embodiment

A wireless communication apparatus according to a fourth embodiment represents an example of a slot antenna having a dielectric material in the above-described notch portion 9 in the form of an inverted L as shown in FIG. 4 and FIG. 5.

Figure 11:
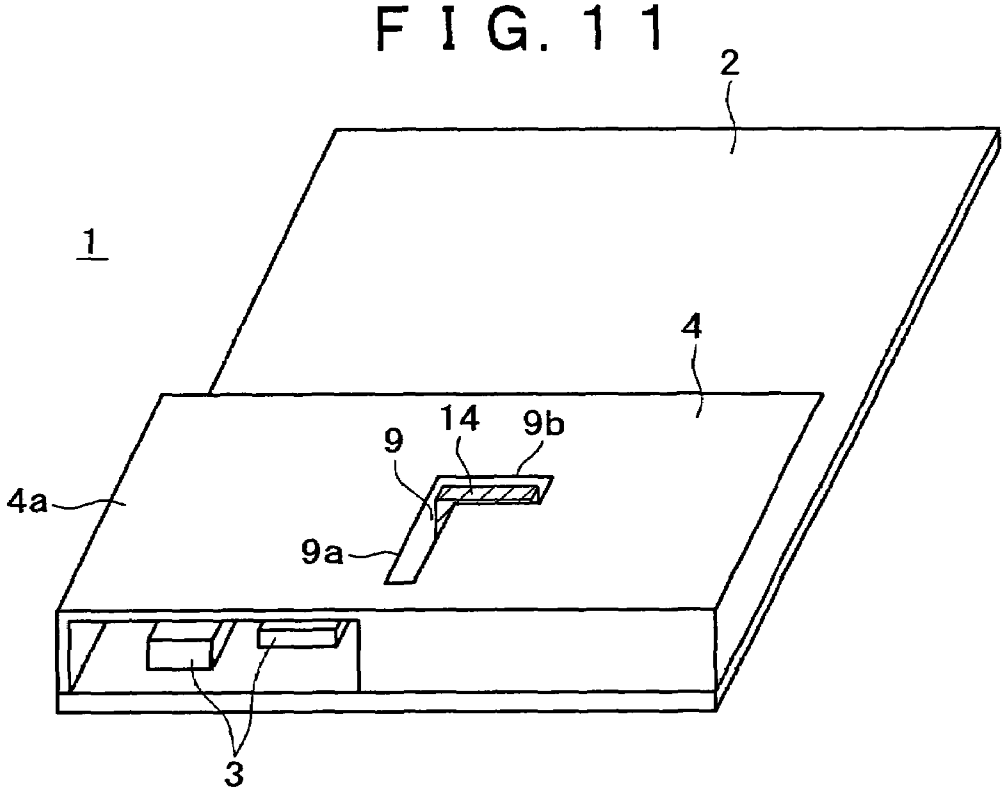
FIG. 11 is a perspective view of a wireless communication apparatus according to a fourth embodiment having a slot antenna including a dielectric material in a notch portion.
Figure 12:
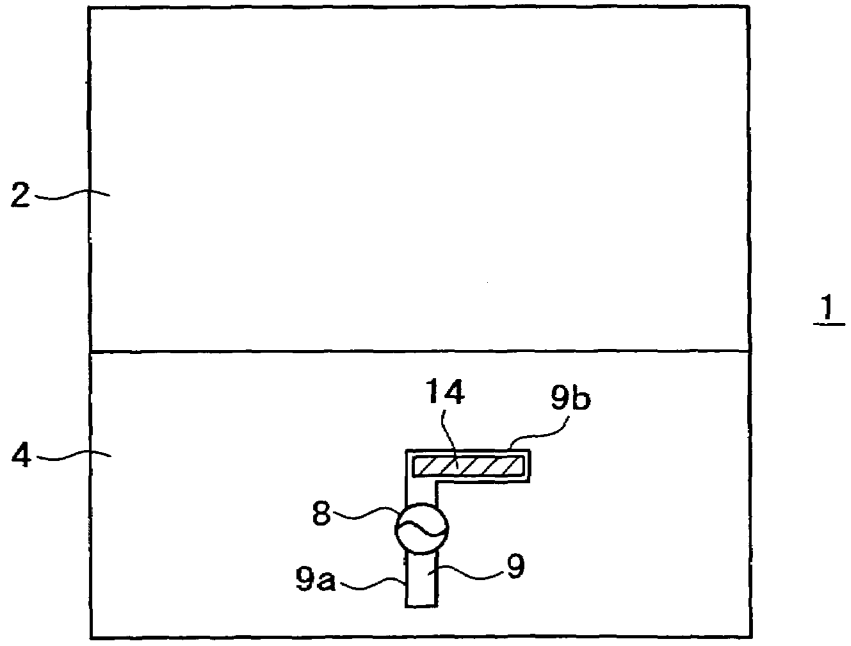
FIG. 12 is a plan view of the wireless communication apparatus according to the fourth embodiment shown in FIG. 11.

As shown in FIG. 11 and FIG. 12, the wireless communication apparatus has a dielectric substance 14 formed of the dielectric material in a bent portion 9*b* of the notch portion 9 in substantially the plane shape of an inverted L. The dielectric material includes for example ceramic, Teflon (registered trademark) and the like.

Thus, since the dielectric material has a wavelength shortening effect, the dielectric substance 14 provided in the notch portion 9 makes it possible to shorten length of the notch portion 9. It is thus possible to make the slot antenna smaller, and expect reduction in size of the wireless communication apparatus. Further, by adjusting an amount of dielectric substance 14 to be used, it is possible to adjust antenna characteristics as required.

Incidentally, while the dielectric substance 14 is provided in the notch portion 9 in FIG. 11 and FIG. 12, the dielectric substance 14 may be provided in the vicinity of the notch portion 9. For example, the dielectric substance 14 is provided around the periphery of an opening of the notch portion 9 on a top surface 4*a* of a shield case 4.

Fifth Embodiment

A wireless communication apparatus according to a fifth embodiment is an example in which a conductive substance 15 formed of a conductive material is provided in the vicinity of the open end of the above-described notch portion 13 forming the notch antenna shown in FIG. 9 and FIG. 10.

Figure 13:
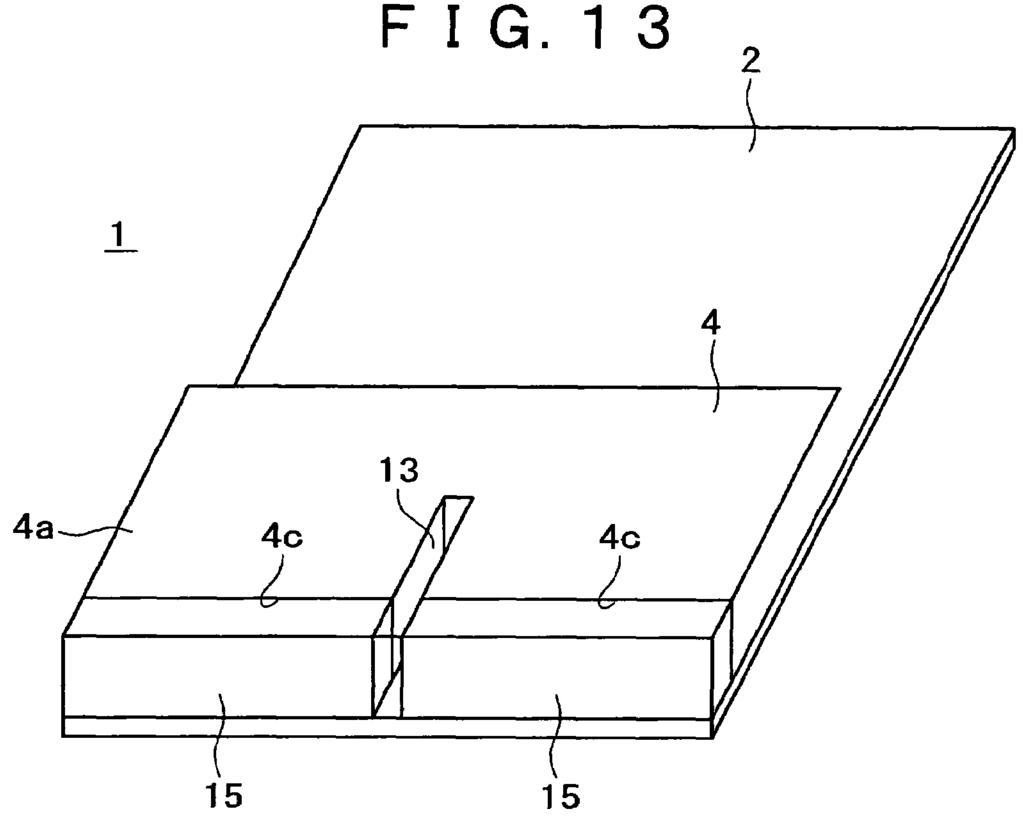
FIG. 13 is a perspective view of a wireless communication apparatus according to a fifth embodiment having a notch antenna including a conductive material on a front end surface of a shield case on an open end side of a notch portion.
Figure 14:
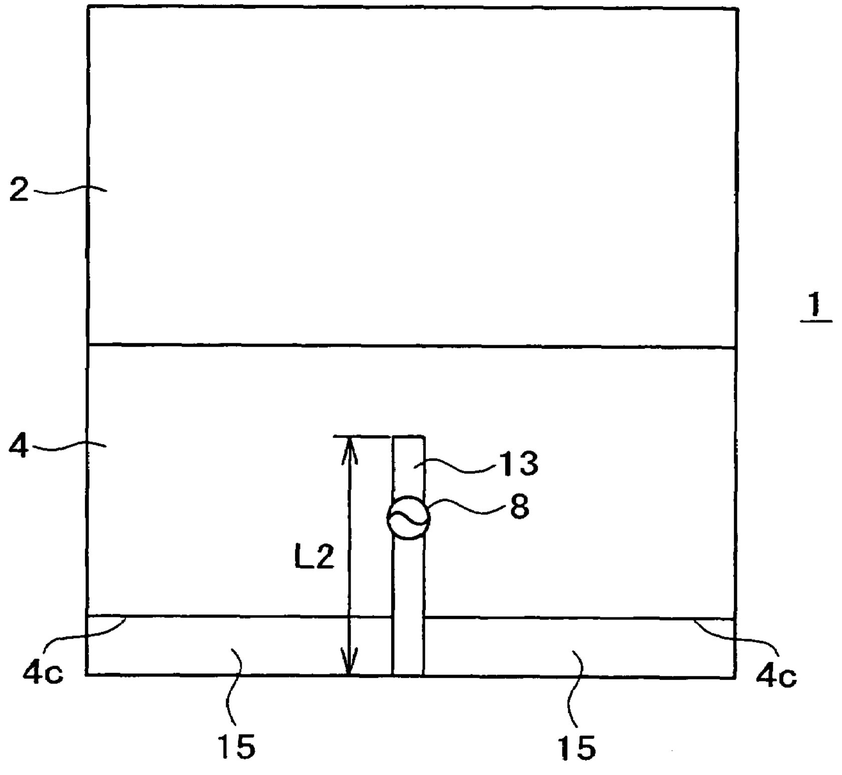
FIG. 14 is a plan view of the wireless communication apparatus according to the fifth embodiment shown in FIG. 13.

As shown in FIG. 13 and FIG. 14, the wireless communication apparatus has the conductive substance 15 on a front end surface 4*c* of a shield case 4 on the open end side of the notch portion 13. Length L2 of the notch portion 13 can be adjusted by the conductive substance 15. A method that can be employed to form the conductive substance 15 on the front end surface 4*c* includes a method of joining a metal as a conductive material, a method of plating with a conductive material or the like.

Thus, the conductive substance 15 is provided on the front end surface 4*c* of the shield case 4 on the open end side of the notch portion 13, and the length L2 of the notch portion 13 can be lengthened or shortened by the conductive substance 15. Hence, by adjusting the length of the conductive substance 15, it is possible to adjust the length of the notch appropriately, and adjust antenna characteristics as required.

Other Embodiments

While concrete embodiments to which the present invention is applied have been described above, the present invention is susceptible of various modifications without being limited to the foregoing embodiments.

Also, while the foregoing embodiments have been described by taking a portable telephone as an example, the present invention is not limited to portable telephones. The present invention provides similar effects when applied to portable terminal apparatus such for example as cordless telephones, hand-held PCs (Personal Computers), PDAs (Personal Digital Assistants) having a communication function, and the like.

According to the present invention, it is possible to reduce the size of a wireless communication apparatus as a whole and improve performance of an antenna device without increasing the number of parts and with a simple structure.

What is claimed is:

1. A wireless communication apparatus comprising:

a conductive member disposed on a board so as to cover a circuit component installed on said board; and a slot antenna including a notch portion having walls forming a through channel from an upper surface to a lower surface of the conductive member; and feeding means for feeding power to the notch portion, wherein the conductive member provides the slot antenna, and shields the circuit component disposed on the board.

2. The wireless communication apparatus as claimed in claim 1, wherein at least a part of said notch portion is bent.

3. The wireless communication apparatus as claimed in claim 1, wherein one end of said notch portion is opened, whereby a notch antenna is formed.

4. The wireless communication apparatus as claimed in claim 3, wherein a conductive material allowing adjustment of length of said notch portion is disposed in a vicinity of the opened end of said notch portion.

5. The wireless communication apparatus as claimed in claim 1, wherein a dielectric material is disposed within said notch portion or in a vicinity of said notch portion.

6. The wireless communication apparatus as claimed in claim 1, wherein said circuit component is a radio-frequency signal processing circuit for transmitting and receiving a radio-frequency signal; and said conductive member is a shield case having a conductivity, for blocking unnecessary electromagnetic waves emitted from said radio-frequency signal processing circuit.

7. The wireless communication apparatus as claimed in claim 6, wherein an inside portion of said shield case covering said radio-frequency signal processing circuit functions as a shield portion for blocking said unnecessary electromagnetic waves, and an outside portion of said shield case functions as a ground conductor of said antenna.

* * * * *